June 4, 1940.  H. F. KURTZ  2,203,389
APPARATUS FOR CUTTING CONTOURS
Filed Nov. 13, 1939

HENRY F. KURTZ
INVENTOR
BY
ATTORNEYS

Patented June 4, 1940

2,203,389

UNITED STATES PATENT OFFICE 2,203,389

APPARATUS FOR CUTTING CONTOURS

Henry F. Kurtz, Rochester, N. Y., assignor to Bausch & Lomb Optical Company, Rochester, N. Y., a corporation of New York Application November 13, 1939, Serial No. 303,958

7 Claims. (Cl. 90—13.2)

The present invention relates to cutting machines and more particularly to an apparatus for forming intricate shapes and contours with a high degree of accuracy.

One of the objects of the present invention is to provide an apparatus for forming intricate shapes and contours with a high degree of accuracy. Another object is to provide a cutting or forming machine in which the action of the tool on the work can be accurately represented and followed at high magnification. A further object is to provide a cutting or forming machine in which the cutting action is represented by the enlarged image of a template projected on a screen. These and other objects and advantages reside in certain novel features of construction, arrangement and combination of parts as will hereinafter be more fully set forth and pointed out in the appended claims.

Figures 1, 2:
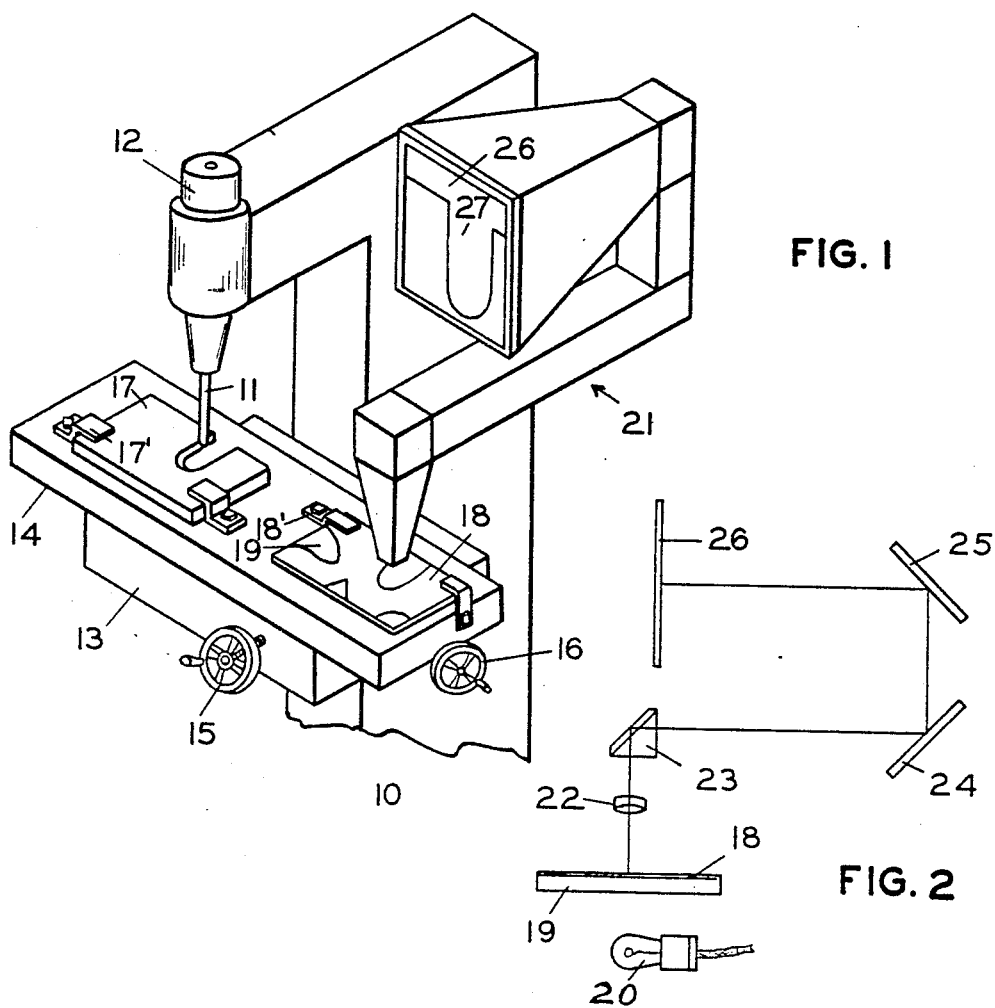
Fig. 1 is a fragmentary perspective view of an apparatus embodying my invention.
Fig. 2 is a diagrammatic illustration of a suitable optical projection system.

In the embodiment shown in the drawing, the entire apparatus is supported on a suitable base or pedestal 10. A suitable tool such as the milling cutter 11 is carried by the pedestal 10 and may be rotated by the motor 12.

A carriage 13 is vertically adjustable on the pedestal 10 beneath the cutter 11 and may be raised or lowered by a suitable mechanism not shown. A horizontal cross slide table 14 is mounted on the carriage 13 and may be moved about in a horizontal plane by the handles 15 and 16.

The table 14 is relatively long and one end extends under the cutting tool 11. The work piece 17 to be shaped is secured on the table 14 by removable clamps 17' and is movable with the table 14 relative to the cutting tool 11 so that it may be cut to the desired shape or contour.

A template 18 having the exact size and shape to which the work piece is to be cut is suitably secured at the other end of the table as, for example, by clamps or clips 18'. This template 18 may be of wood, paper or metal or may be a drawing or reproduction of a drawing. In fact, in the practice of my invention, a drawing of the finished form is made at any desired scale. This drawing is then photographically reduced to the actual size of the piece to be made and the photographic reduction used as the template.

This template 18 may be illuminated in any suitable way but I prefer to use transmitted light. In the form shown, the cross slide table 14 is provided with an opal or frosted glass insert 19 and the template 18 is placed on this insert. A suitable lamp 20 within the table 14 directs light upward through the insert 19.

A projection apparatus indicated generally at 21 is carried by the pedestal 10 directly above the template 18. The position of the projection apparatus 21 relative to the template 18 is substantially identical with the position of the tool 11 relative to the work piece 17. In other words, the center of the object field imaged by the projector corresponds to the position of the center of the tool 11.

One suitable optical system for the projection apparatus is described and claimed in U. S. Patent 1,934,582, issued November 7, 1933, to Edward Bausch and myself. This optical system comprises a suitable objective lens 22 for forming an enlarged image. Directly above this lens 22 is a right angle roof prism 23 which directs the image forming rays horizontally and reverses them left for right. Two reflectors 24 and 25, together with the prism 23, reinvert the projected image so that the projected image is erect and in proper right and left position when it reaches the projection screen 26. Depending on its focal length, the lens 22 may, of course, be placed between the prism 23 and the reflector 24 but its optical axis is always effectively parallel to the axis of the tool 11.

An indicating spot 27 is placed on the screen 26 in the center of the image field. This spot 27 is made the effective size and shape of the tool 11 enlarged to the same extent that the projected image of the template 18 is enlarged.

In operation both the work piece 17 and template 18 are fastened on the table 14. The projection apparatus is adjusted to give the desired magnification and a spot or mark 27 corresponding to the effective tool size and shape at that magnification is placed on the screen 26. The handles 15 and 16 are moved to bring different parts of the work piece 17 into operative relation with the tool 11. Throughout the movement of the table 14, the enlarged image of the template 18 is kept tangent to the spot 27 and, when the image of the entire periphery of the template has been passed by the spot 27, the work piece has been cut to the exact shape of the template.

It is not necessary or even particularly desirable that the image of the entire template appear on the screen 26 at one time. In fact, the projection of a small portion of the template at one time, as shown in Fig. 1, permits the use of a very small and compact screen and permits the use of a relatively inexpensive optical system.

From the foregoing, it will be apparent that I am able to attain the objects of my invention and provide an apparatus in which intricate forms can be readily cut with great accuracy. Various modifications can, of course, be made without departing from the spirit of my invention and the scope of the appended claims.

I claim:

1. An apparatus for cutting contours on a work piece comprising a support, a tool carried by said support, means for operating said tool, a projection screen carried by said support, means on the projection screen for indicating the effective size and shape of said tool at a predetermined magnification, a cross slide table adjustably mounted on said support, means on said cross slide table for supporting the work piece to be cut, a template formed to the contour to be cut, means for supporting said template on said table in spaced relation to said work piece, a projection system for forming an image of said template on said screen at said predetermined magnification and means for supporting said projection system and said tool in fixed relation to each other and to said support, the optical axis of the projection system bearing the same geometric relation to the template that the axis of the tool bears to the work piece.

2. An apparatus for cutting contours on a work piece comprising a support, a cross slide table adjustably mounted on said support, means on said table for supporting a work piece, means on the table for supporting in spaced relation to the work piece a template having the contour to be cut, a cutting tool carried by said support in operative relation to said work piece, a projection apparatus carried by said support for projecting an image of a portion of the template at a predetermined magnification, the projection apparatus being positioned in the same geometric relation to the template that the tool bears to the work piece, a screen for receiving the projected image of the template, and indicating means on the screen having the effective outline and diameter of the tool at the predetermined magnification.

3. An apparatus for cutting predetermined contours comprising a support, a tool carried by said support, means carried by the support to operate said tool, a cross slide table movably mounted on said support, means for supporting a work piece on said table in operative relation to said tool, means for supporting a template having the predetermined contour on said table, a projection screen carried by the support, means carried by the support for projecting an image of said template on said screen at a predetermined magnification, means on said screen for indicating the position of said tool at said magnification, and means for moving the cross slide table so as to keep the image of the template on the screen in tangential contact with the means on the screen for indicating the position of the tool.

4. An apparatus of the class described, comprising a support, a cutting tool carried by said support, means for rotating said cutting tool, a projection apparatus for forming images at a predetermined magnification carried by said support in spaced relation to said tool, said projection apparatus including a lens having its optical axis parallel to the axis of rotation of the tool, a screen carried by said support for receiving an image formed by said projection apparatus, a table movably carried by said support for movement in a plane perpendicular to the axes of the tool and lens, means for moving said table, means for mounting a work piece on said table beneath said tool, means for mounting a template on said table beneath said lens, so that the center of the template is spaced from the center of the work piece by a distance equal to the distance between the axes of the lens and tool, and means on the center of the screen for indicating the effective size and form of the tool at the predetermined magnification.

5. An apparatus of the class described, comprising a support, a cutting tool carried by said support, means for rotating said cutting tool, a projection apparatus for forming images at a predetermined magnification carried by said support in spaced relation to said tool, said projection apparatus including a lens having its optical axis parallel to the axis of rotation of the tool, a screen carried by said support for receiving an image formed by said projection apparatus, a table movably carried by said support for movement in a plane perpendicular to the axes of the tool and lens, means for moving said table, means for mounting a work piece on said table beneath said tool, means for mounting a template on said table beneath said lens, so that the center of the template is spaced from the center of the work piece by a distance equal to the distance between the axes of the lens and tool, means on the center of the screen for indicating the effective size and form of the tool at the predetermined magnification, and an optical erecting system carried by said support between said lens and said screen.

6. An apparatus for cutting predetermined contours comprising a support, a milling cutter carried by said support, means for rotating said milling cutter, a table adjustably mounted on said support for movement in a plane perpendicular to the axis of said milling cutter, means on said table for supporting a work piece in operative relation to said cutter, means for adjusting said table and the work piece carried thereby relative to said cutter, a projection apparatus including an objective and a screen for receiving an image formed by said lens and spaced from said lens by a fixed optical distance, means for supporting said projection apparatus in fixed relation to said milling cutter, a template formed to the predetermined contour to be cut, means for adjustably supporting said template in the plane of said lens conjugate to said screen, means for operatively interconnecting said template and said table whereby said template is moved with said table, and means on said screen for representing the size, shape and location of the tool at the magnification produced by said projection apparatus.

7. An apparatus for cutting predetermined contours comprising a support, a milling cutter carried by said support, means for rotating said milling cutter, a table adjustably mounted on said support for movement in a plane perpendicular to the axis of said milling cutter, means on said table for supporting a work piece in operative relation to said cutter, means for adjusting said table and the workpiece carried thereby relative to said cutter, a projection apparatus including an objective and a screen for receiving an image formed by said lens and spaced from said lens by a fixed optical distance, means for supporting said projection apparatus in fixed relation to said milling cutter, a template formed to the predetermined contour to be cut, means for adjustably supporting said template in the plane of said lens conjugate to said screen, means for operatively interconnecting said template and said table whereby said template is moved with said table, means on said screen for representing the size, shape and location of the tool at the magnification produced by said projection apparatus, and an optical erecting system carried by said projection apparatus between said lens and said screen.

HENRY F. KURTZ.